United States Patent
Hori et al.

(10) Patent No.: US 6,441,827 B1
(45) Date of Patent: Aug. 27, 2002

(54) IMAGE REPRODUCTION APPARATUS HAVING FUNCTION OF DISPLAYING SYNTHESIZED DATA BY VARYING PART OF ORIGINAL IMAGE DATA

(75) Inventors: Osamu Hori; Toshimitsu Kaneko; Toshiaki Watanabe, all of Yokohama; Takashi Ida, Kawasaki; Noboru Yamaguchi, Yashio; Yoko Sambonsugi, Yamato, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/342,731

(22) Filed: Jun. 29, 1999

(30) Foreign Application Priority Data

Jun. 30, 1998 (JP) .......................................... 10-185125

(51) Int. Cl.$^7$ .............................................. G06T 11/60
(52) U.S. Cl. ...................................................... 345/629
(58) Field of Search ................................ 345/435, 326, 345/433, 112, 118, 113, 619, 629, 630; 386/4, 55

(56) References Cited

U.S. PATENT DOCUMENTS

| | | | | |
|---|---|---|---|---|
| 5,315,703 A | * | 5/1994 | Matheny et al. | 345/326 |
| 5,659,793 A | * | 8/1997 | Escobar et al. | 345/435 |
| 5,754,190 A | * | 5/1998 | Dutton et al. | |
| 5,873,097 A | * | 2/1999 | Harris et al. | 707/203 |

* cited by examiner

Primary Examiner—Jeffery Brier
(74) Attorney, Agent, or Firm—Oblon, Spivak, McClelland, Maier & Neustadt, P.C.

(57) ABSTRACT

An image displaying apparatus includes an image storing unit storing image data containing two or more objects. An extracting unit extracts individual data from the object of the image data. An input unit inputs additional partial image data, and attribute data representing a corresponding relationship of at least part of the image data to the additional partial image data. An associating unit associates the additional partial image data with an individual data of the image data, using the attribute data input via the input unit. A synthesizing unit modifies a data content regarding at least part of the image data, which is associated by the associating unit, and synthesizes the modified content with the image data stored in the image storing unit.

20 Claims, 8 Drawing Sheets

IMAGE REPRODUCTION APPARATUS HAVING FUNCTION OF DISPLAYING SYNTHESIZED DATA BY VARYING PART OF ORIGINAL IMAGE DATA

BACKGROUND OF THE INVENTION

The present invention relates to an image reproduction apparatus and an image reproducing method, as well as a recording medium in which a program for a computer to carry out the image reproduction process, is stored.

For example, there has been proposed an image reproduction apparatus for reproducing synthesized image data as contents having data structures of two or more different types, which are represented by object data used in an MPEG 4 mode.

Figure 11:
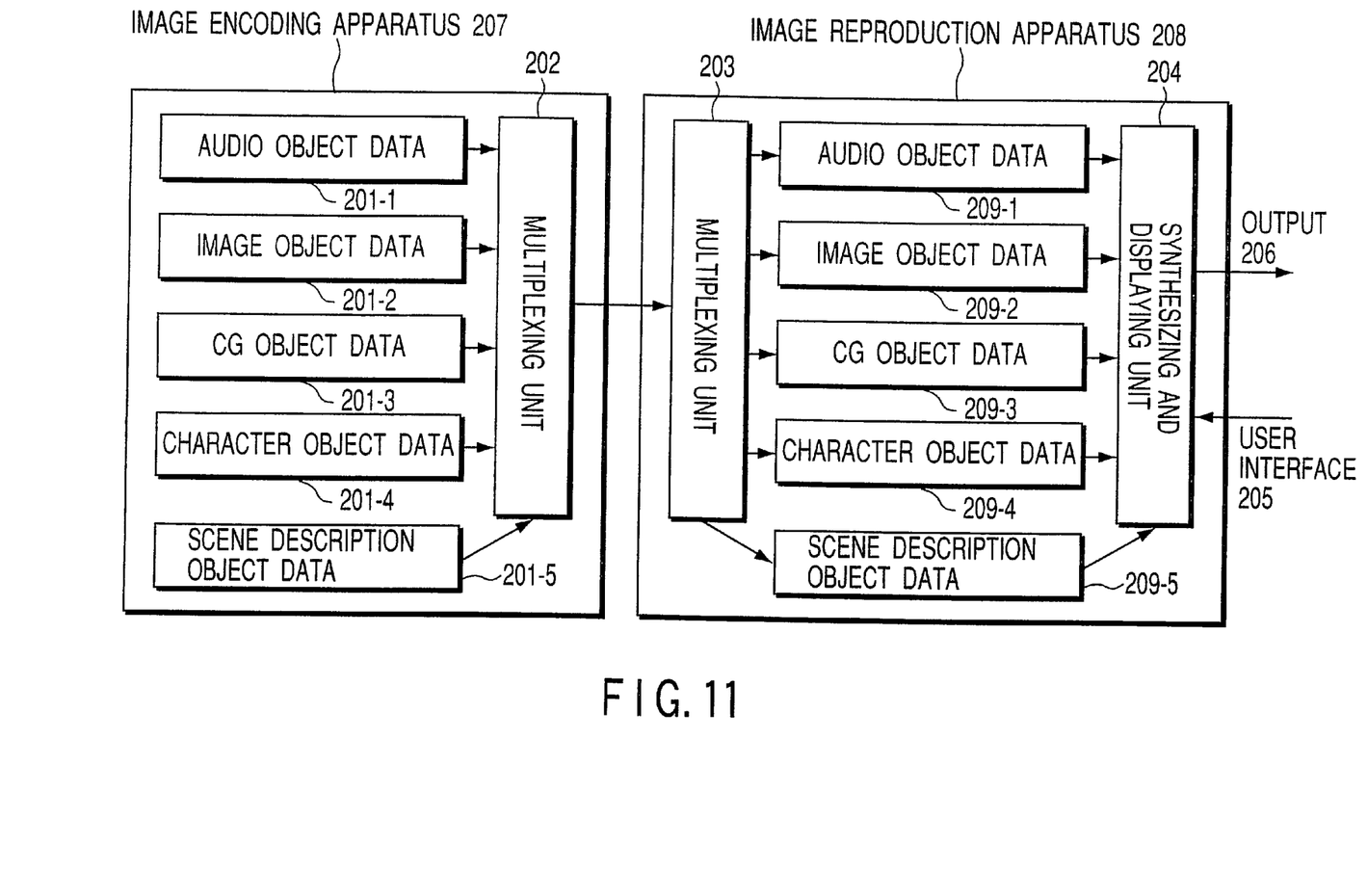
FIG. 11 is a diagram showing the structure of the conventional image reproducing apparatus.

FIG. 11 is a diagrams showing a device for encoding image data containing conventional various data structures, and a structure of the device which reproduce such image data. In an image encoding device 207, various object data 201-1 to 201-5 to be handled are input, and they are subjected to a multiplying process by a multiplying process 202, and thus image data is formed. In the conventional image reproduction apparatus 208, these image data are subjected to multiple separation by a multiple processing portion 203, to be separated into individual object data 209-1 to 209-4, and an image to be displayed is formed on the basis of scene description object data 209-5. In some cases, the synthetic display at the synthetic display section 204 is controlled on the basis of event data from a user interface 205, and the result is outputted as an output 206.

The above-described conventional image reproduction apparatus merely reproduces image data which was formed in advance, as it is and as it is determined. Further, even for a partial little change in data, such a newly changed data, which reflects the changed portion instantaneously, cannot be reproduced unless the image data is reedited. Further, for example, if image data which have such a relationship as of a background and an object is synthesized and displayed, it becomes impossible to know which portion is the object if the user tries to operate the object, and therefore the operation is not very much easy.

BRIEF SUMMARY OF THE INVENTION

Therefore, the object of the present invention is provide an image reproduction apparatus, an image reproduction method and recording medium, which can reproduce data while part of the data is updated as new image data, without reediting the original image.

In order to achieve the above-described object, there is provided according to the first aspect of the present invention, an image displaying apparatus comprising:

an image storing unit storing image data containing two or more objects;

an extracting unit extracting individual data from the object of the image data;

an input unit inputting additional partial image data, and attribute data representing a corresponding relationship of at least part of the image data to the additional partial image data;

an associating unit associating the additional partial image data with an individual data of the image data, using the attribute data input via the input unit; and a synthesizing unit modifying a data content regarding at least part of the image data, which is associated by the associating unit, and synthesizing the modified content with the image data stored in the image storing unit.

Further, there is provided according to the second aspect of the present invention, an image reproduction method for extracting individual data from image data containing two or more different types, and synthesizing them to be displayed; the method comprising:

an input step for inputting additional partial image data which is different from the image data, and attribute data representing a corresponding relationship of at least part of the image data to the additional partial image data;

an associating step for associating the additional partial image data with an individual data of the image data, using the attribute data input in the input step; and a synthesizing and reproducing step for changing a data content regarding at least part of the image data, which is associated in the associating unit, and synthesizing the changed content with other input image data, to be reproduced.

Further, there is provided according to the third aspect of the present invention, a recording medium storing an image reproduction program for extracting individual data from image data containing two or more different types, and synthesizing them to be displayed; the image reproduction program comprising:

an input process for inputting additional partial image data which is different from the image data, and attribute data representing a corresponding relationship of at least part of the image data to the additional partial image data;

an associating process for associating the additional partial image data with an individual data of the image data, using the attribute data input in the input step; and a synthesizing and reproducing process for changing a content regarding at least part of the image data, which is associated in the associating unit, and synthesizing the changed content with other input image data, to be reproduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

First, an embodiment of the present invention will now be described briefly. In this embodiment, in addition to that image data is input to the image reproduction apparatus to reproduce it, additional attribute data or additional partial image data are input, the attribute data or partial image data, and individual data within the image data are associated with each other, and image data is synthesized and reproduced on the basis of the associated data. In this manner, part of the original data is updated without reediting the original image, and image data can be reproduced as new image data. Further, the synthesizing display method can be varied on the basis of the attribute data uniquely owned by the user, and therefore functions of not displaying an object or the like which should be hidden, displaying a list of objects, and the like can be achieved. Further, the outline of partial image data which should be drawn to the user's attention is displayed with emphasis, or the partial image is flashed at a constant time cycle to draw the user's attention, thus providing a smooth image operating environment.

Figure 1:
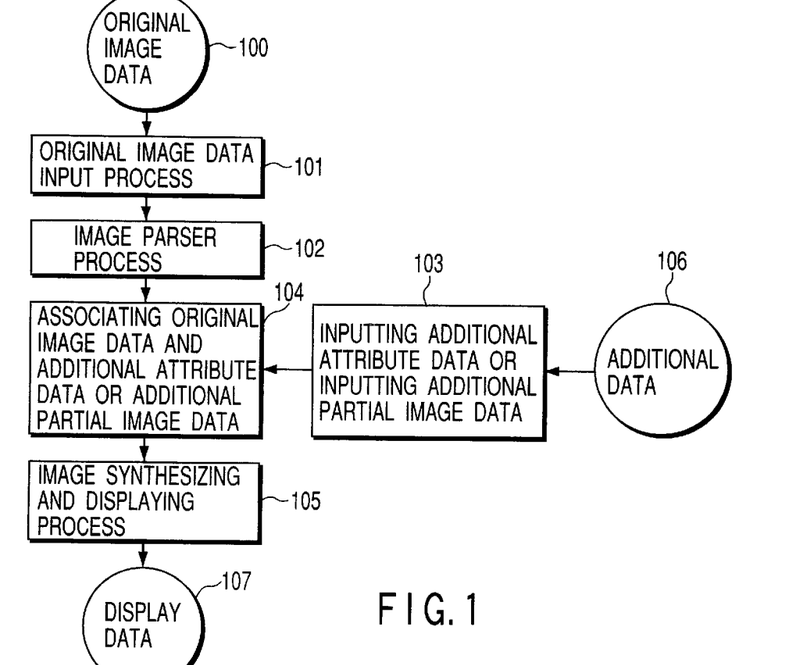
FIG. 1 is a diagram showing a basic process flow of an image reproduction apparatus according to an embodiment of the present invention.

An embodiment of the present invention will now be described in detail with reference to drawings. FIG. 1 is a diagram illustrating a basic processing flow of an image reproduction apparatus according to an embodiment of the present invention. The present system includes a process 101 for inputting original image data 100 having two or more different data structure, an image parser process 102 for fetching various types of individual data by parsing the original image data 100, a process 103 for inputting, apart from the original image data 100, attribute data or partial image data, as additional data 106, a process 104 for associating the original image data 100 with additional attribute data or additional partial image data 106, and an image synthesizing and display process 105 for outputting display data 107 used for synthesizing and reproducing images on the basis of the associated results or for displaying them with emphasis.

Figure 2:
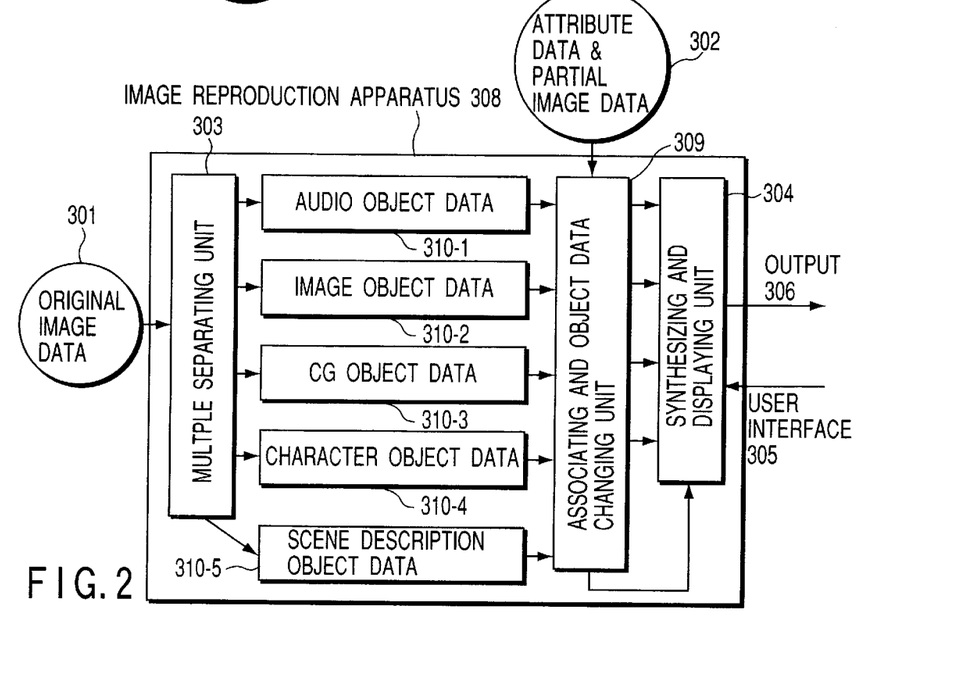
FIG. 2 is a diagram showing the structure of the image reproduction device which executes reproduction process of the embodiment.

FIG. 2 is a diagram showing the structure of an image reproduction apparatus 308 which carries out the above-described reproduction process. An original image data 301 inputted is subjected to multiple separation by a multiple separation unit 303, and thus individually separated object data 310-1 to 310-5 are obtained. The associating and object data changing unit 309 associates separately input attribute data or partial image data 302 to, and changes individual data on the basis of the association data. The synthesizing display unit 304 synthesizes the object data 310-1 to 310-4 on the basis of the scene description object data 310-5 which instructs the way the data are synthesized and displayed, and outputs the synthesized data as new image data (306). Further, as in the conventional apparatus, the synthesized display can be changed in accordance with the instruction of the user interface 305.

Figure 3:
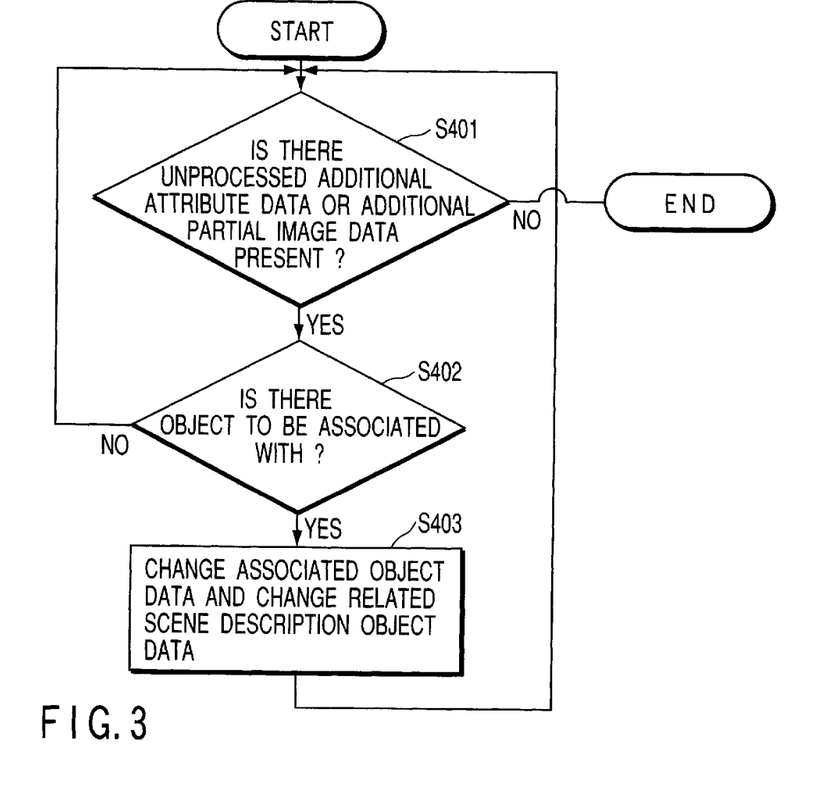
FIG. 3 is a flowchart illustrating the process of associating and object data changing unit, shown in FIG. 2.

Here, the process at the associating and object data varying unit 309 will now be described in detail with reference to flowchart shown in FIG. 3. Attribute data or partial image data inputted as additional data has information of ID numbers respectively assigned to the objects of the original image data in advance, and the information indicates when object data should be changed. Therefore, as the information and the ID number of each object fetched after being subjected to the multiple separation, are identified with each other, the object to be processed can be found.

First. In Step S401, it is judged if unprocessed attribute data and partial image data are present. If they are present, the operation proceeds to step S402, where the object data whose ID number matches is searched, and it is confirmed if an object to be subjected to the association is present. When an object whose ID number matches is found, the object data to be processed is changed using the attribute data or partial image data in step S403. In the data changing operation, all of the object data may be changed or they may be partially changed. In connection with the changing, necessary information is reflected on scene description object data. It is possible that some of the attribute data contains the instruction of changing only the scene description object data.

The changed object is synthesized and displayed as image data which is different from the object data before the changing, which was seen by the user by then. However, it is difficult for the user to recognize the renewed object immediately, and therefore it is possible that the renewed object obtained by changing the scene description object data, is emphasized in the display. In order to realize the emphasis display, the object emphasizing means which is already realized by the conventional image reproduction apparatus may be used, or the data processing which can make the display emphasized may be carried out on the object data itself to be replaced.

Figure 4:
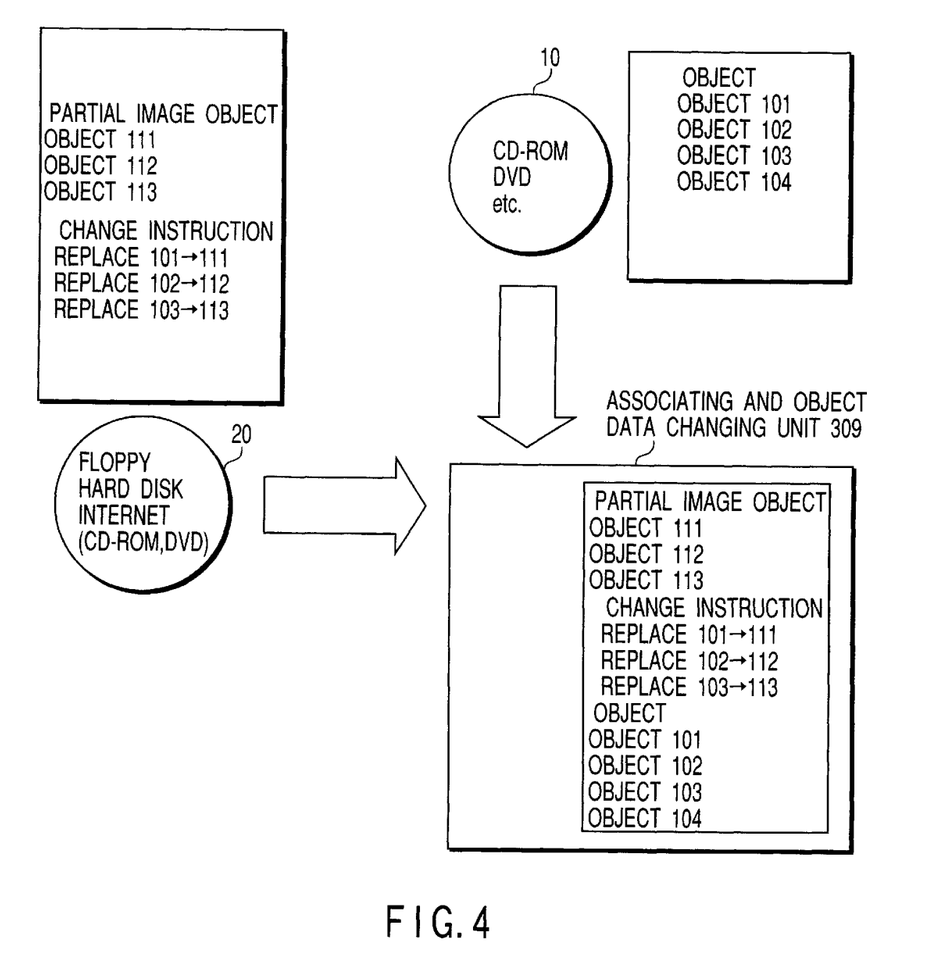
FIG. 4 is a diagram illustrating a specific example of the process in the associating and object data changing unit 309.
Figure 5A:
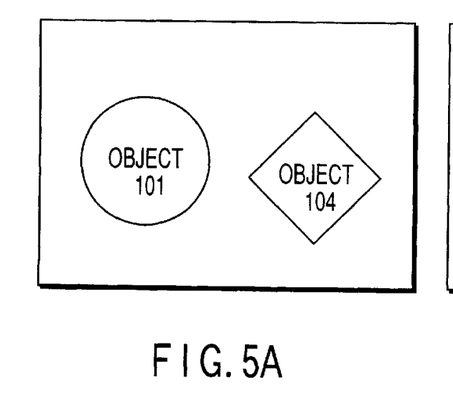
FIGS. 5A and 5B are diagrams illustrating that part of image data is changed by the associating and object data changing process.
Figure 5B:
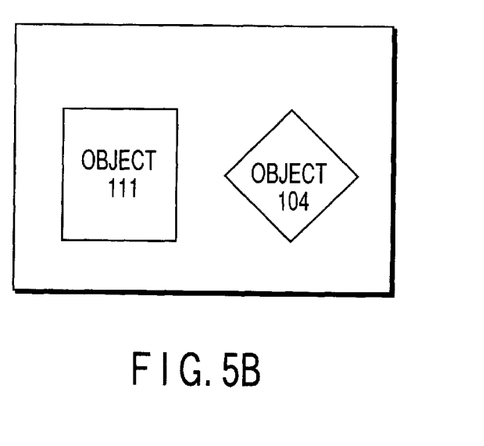

FIGS. 4 and 5 are diagrams illustrating the process in the associating and object data changing unit 309 with reference to a specific example.

As shown in FIG. 4, as the first image data to be input to the image reproduction apparatus, various types of original image objects (object 101, object 102, object 103 and object 104) stored in the recording medium 10 such as CD-ROM or DVD are considered. Further, as the second image data to be input to the image reproduction apparatus, various types of additional partial image objects (objects to be changed) (object 111, object 112, object 113) and change instructions as additional attribute data (replace 101→111, replace 102→112, replace 101→113) are considered. In the change instruction, the numeral located on the left-hand side of symbol (→) indicates the object to be changed, and the numeral located on the right-hand side of symbol (→) indicates the object which has been changed. The second image data is stored in the memory medium 20 such as floppy disk, CD-ROM, DVD or hard disk, and sent in a different route (for example, mail). Or the data is downloaded from the Internet and stored in the hardware.

The image reproduction apparatus of the embodiment reads out the first image data stored in the memory medium 10 and the second image data stored in the memory medium 20, and the two image data are associated with each other, and the object data is changed by the association and object data changing unit 309 equipped in the apparatus.

More specifically, the association and object data changing unit 309 associates objects 101, 102 and 103, out of inputted objects 101, 102, 103 and 104, which are to be changed by the change instruction, with partial image objects 111, 112 and 113, and then changes to the partial image object 111, 112 and 113. After the change process, the data are synthesized and displayed on the synthesizing and display unit 304.

FIG. 5A shows a state of an object before being changed, and FIG. 5B shows a state of the object which has been changed by the change process. As can be seen from these figures, the object 101 is changed to object 111 and the object 104 is displayed as it is without being changed since there is no instruction of changing.

Figure 6:
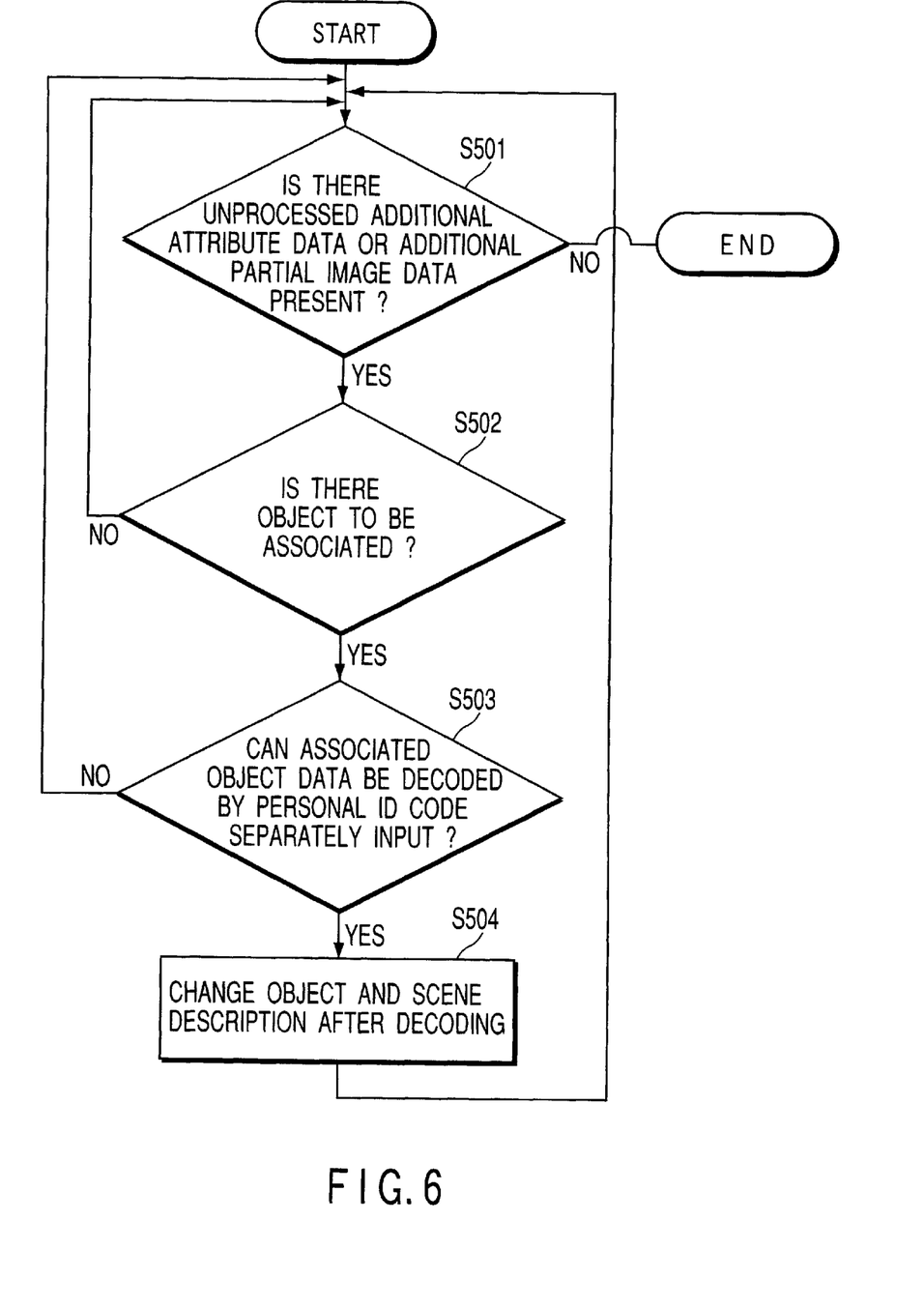
FIG. 6 is a flowchart illustrating a first alternative example of the present embodiment.

Next, the first alternative example of the above-described embodiment will now be described. When there is a request of displaying internal objects only to a particular user, it is required to have a function of associating a user and an object to each other and carrying out verification by any means. In order to achieve this, the object is encrypted in advance into a coded number. More specifically, as shown in FIG. 6, it is judged as to whether or not there is additional attribute data or additional partial image data, which has not been processed (step S501) and whether or not there is an object to be associated with (step S502). Then, it is judged whether or not the object which has been associated with can be decoded with the personal identification code owned by the user (step S503). If it can be decoded, the object is decoded, and the object after being decoded and the scene description are changed (step S504).

Figure 7:
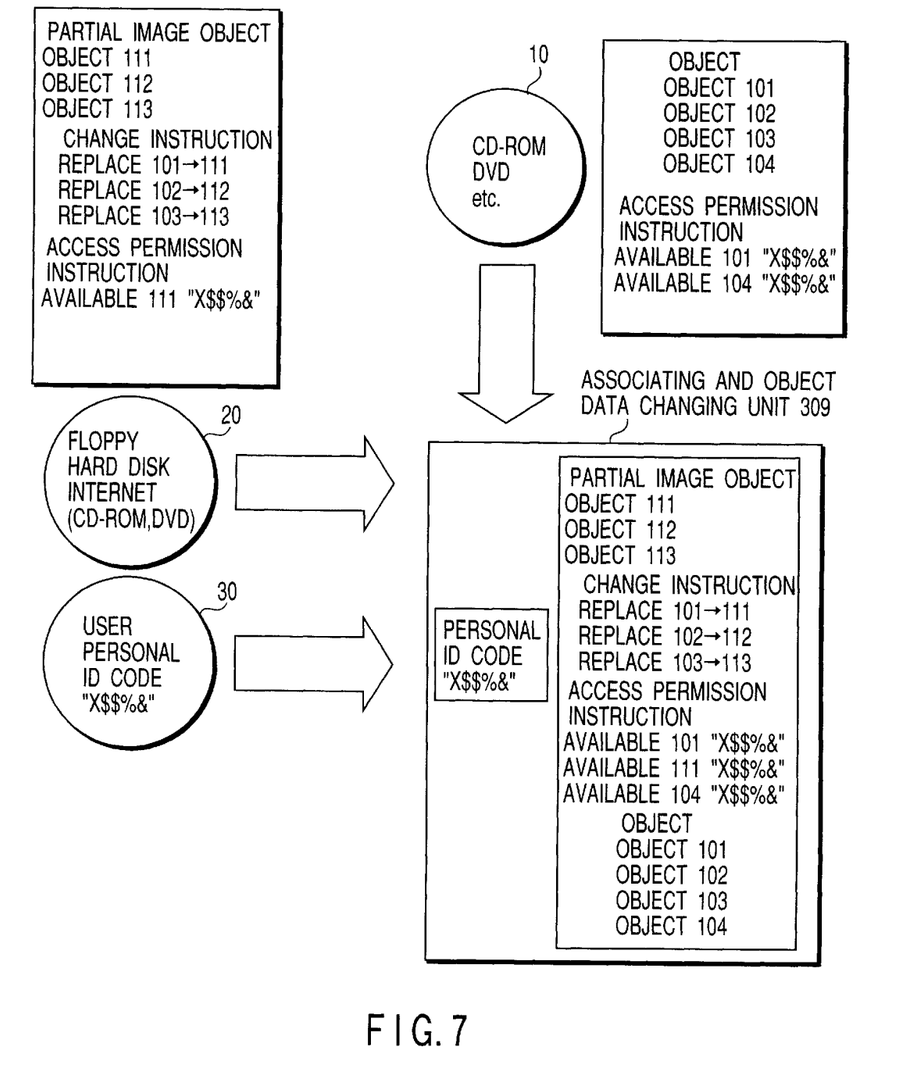
FIG. 7 is a diagram illustrating the first alternative example with reference to a specific example.

A specific example of the first alternative example will now be described. Here, as the first image data to be input to the image reproduction apparatus, various types of objects (object 101, object 102, object 103 and object 104) and access permission instructions (Available 101 "X$$%&", Available 104 "X$$%&") are considered. In the above access permission instruction, X$$%& indicates a particular personal security code or cryptic code.

Further, as the second image data to be input to the image reproduction apparatus, various types of additional partial image objects (object 111, object 112 and object 113), change instructions (Replace 101→111, Replace 102→112 and Replace 101→113), and access permission instructions (Available 101 "X$$%&", Available 104 "X$$%&") as additional attribute data are considered.

In this alternative example, the associating and object data changing unit 309 associates the objects 101, 102 and 103, out of the inputted objects 101, 102, 103 and 104, which should be changed under the above change instruction, with the partial image objects 111, 112 and 113, and then changes to the image objects 111, 112 and 113. Here, it is checked if there is an object of the cryptic number which matches the personal security code (user cryptic code) 30 input from the user interface, with reference to the access permission instruction, and only those of the objects which have been judged to match are displayed.

In the above-described embodiment, when, of the second image data, at least change instruction and access permission instruction are read from a memory medium to the apparatus in advance, the processing time can be shortened.

Next, the second alternative example of the embodiment will now be described. As to the memory medium 10 or 20, when there are various objects present in the medium, the user, in some cases, would like to know what sort of objects are present. Therefore, here, an object is fetched in advance in the form of a still image (or motion image), and a table list is formed to be displayed, thus improving the visibility.

Figure 8:
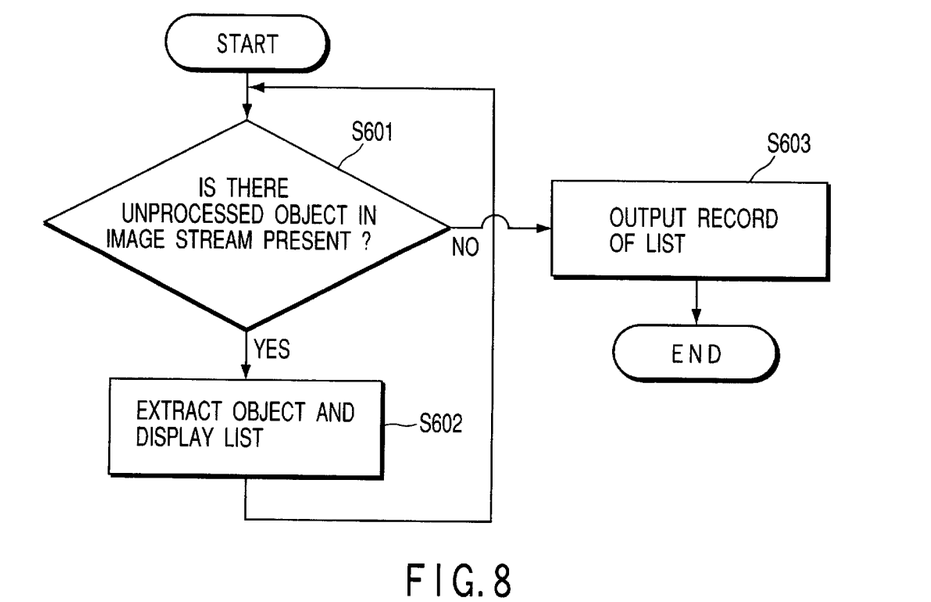
FIG. 8 is a flowchart illustrating the second alternative example of the embodiment of the present invention.
Figure 9:
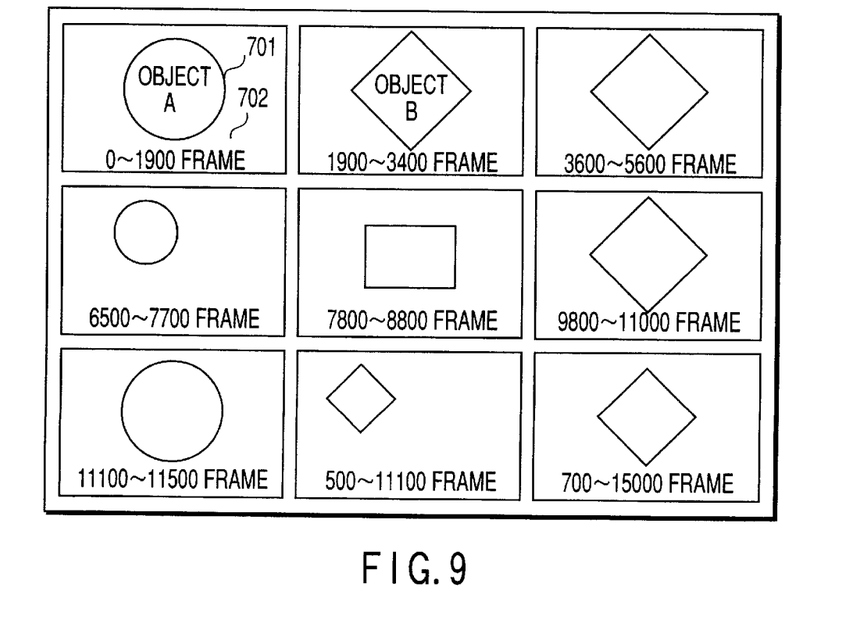
FIG. 9 is a diagram showing an example of the list displayed in the second alternative example.

More specifically, as shown in FIG. 8, while an image stream consisting of a plurality of image objects is parsed (decoded) from the top, it is judged whether or not there is any unprocessed object present in the image stream (step S601) and for example, only the image objects which are not the background are checked, and the presence thereof is confirmed. Further, as shown in FIG. 9, of a plurality of image objects (objects A, B, C, . . . ) which have been confirmed to be present, for example, a still image 701 of the top frame is extracted and displayed as a list together with a frame number 702 (step S602). When the process of the image stream finishes until its end, the list is recorded (step S603). It should be noted that in place of the frame number, the frame may be converted into time, which is displayed.

Figure 10:
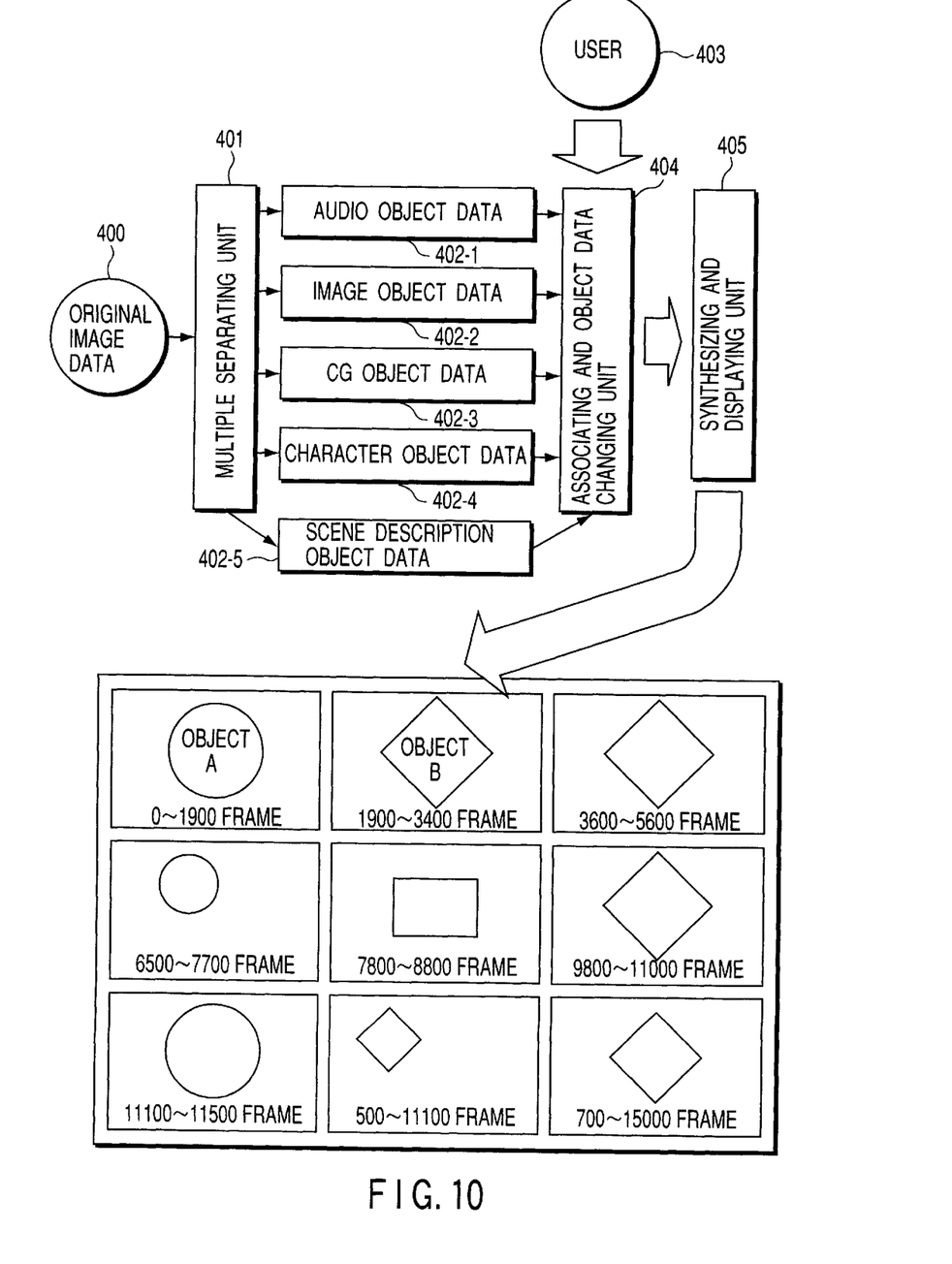
FIG. 10 is a diagram illustrating the procedure for selectively listing original data on a display.

FIG. 10 is a diagram illustrating the procedure of listing original image data selectively. Here, the original image data 400 inputted is multiply separated into various types of object data by the multiple separation unit 401, and then particular objects are extracted on the basis of the instruction from the user 403 or the instruction of default, in the object extraction unit 404. After that, the extracted objects are synthesized, and displayed as a list (405).

It should be noted that image data displayed in a list may not be original image data, but may be object data to be changed. Or these two data may be input at the same time. When they are inputted at the same time, the change results by the object data to be changed may be displayed on a list, or both image objects may be displayed on a list. Further, what is synthesized may not be a still image, but a motion stream data.

In the case where an object is encoded so that only the particular user is allowed to access the object, it is displayed on the basis of the information which can be accessed by the object information. For example, in the case where the size of the object is only in width and height, it is expressed by a rectangular shape, whereas in the case where the shape information can be accessed, only the shape is displayed.

According to the present invention, even if image data has been edited and formed once, it can easily be partially changed and reproduced after that, and therefore the image data can be enjoyed without looking out of date. Therefore, it becomes possible to provide highly personalized services for individual users. Further, an object which has a special significance is displayed with emphasis so that the user can recognize it, and thus if there is a newly updated data present within a screen, it can be easily visually spotted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed:

1. An image displaying apparatus comprising:
   an image storing unit storing original image data containing two or more objects;
   an extracting unit for extracting individual data from the objects of the original image data; an input unit inputting, separate from said original image data:
   1) additional partial image data, and
   2) attribute data specifying one or more functions configured to operate on at least part of the original image data to form function results that correspond to said additional partial image data;
   an associating unit for associating said additional partial image data with an individual data of said original image data, using the functions defined according to the attribute data; and
   a synthesizing unit for modifying a data content regarding the at least part of the original image data that is associated by said associating unit, and for synthesizing the modified content with the original image data stored in said image storing unit.

2. An image display apparatus according to claim 1, wherein said attribute data contains a change function for changing at least part of said original image data to said additional partial image data.

3. An image display apparatus according to claim 2, wherein said synthesizing unit includes a synthesizing and displaying unit for displaying with emphasis the section of said original image data has been changed to said additional partial image data.

4. An image display apparatus according to claim 2, wherein said synthesizing unit displays with emphasis, an outline of the section changed to said additional partial image data.

5. An image display apparatus according to claim 2, wherein said synthesizing and displaying unit flashes the section which has been changed to said additional partial image data at constant intervals.

6. An image display apparatus according to claim 2, wherein:

said attribute data further contains an access permission instruction for permitting an access only to particular data out of said additional partial image data, and said synthesizing unit includes a synthesizing and display unit for determining whether or not the section which has been changed to said additional partial image data should be displayed on the basis of said access permission instruction and a personal security code input by the user.

7. An image display apparatus according to claim 1, wherein said synthesizing unit includes a synthesizing and displaying unit for displaying in a predetermined form, contents of at least one of said original image data and said additional partial image data.

8. An image display apparatus according to claim 1, wherein said synthesizing unit includes a synthesizing and displaying unit for selecting data designated from outside only, from said original image data, and for displaying contents of selected data in a predetermined form.

9. An image display apparatus according to claim 1, wherein said synthesizing unit includes a synthesizing and displaying unit for displaying in a predetermined form, contents of the section of said original image data that has been changed to said additional partial image data.

10. An image reproduction method for extracting individual data from objects of original image data and for synthesizing the extracted individual data to be displayed, said method comprising:

an input step for inputting, separately from said original image data:
1) additional partial image data, and
2) attribute data specifying one or more functions configured to operate on at least part of the original image data to form function results that correspond to said additional partial image data;

an associating step for associating said additional partial image data with an individual data of said original image data, using the functions according to the attribute data; and a synthesizing step for changing a data content regarding the at least part of said original image data that is associated in said associating unit, and for synthesizing the changed content with other original image data.

11. An image display method according to claim 10, wherein said attribute data contains a change function for changing at least part of said original image data to said additional partial image data.

12. An image display method according to claim 11, wherein said synthesizing step includes a synthesizing and displaying step for displaying with emphasis the section of said original image data that has been changed to said additional partial image data.

13. An image display method according to claim 11, wherein said synthesizing and displaying step displays with emphasis, an outline of the section changed to said additional partial image data.

14. An image display method according to claim 11, wherein said synthesizing and displaying step flashes the section which has been changed to said additional partial image data at constant intervals.

15. An image display method according to claim 11, wherein:

said attribute data further contains an access permission instruction for permitting an access only to particular data out of said additional partial image data, and said synthesizing step includes a synthesizing and display step for determining whether or not the section which has been changed to said additional partial image data should be displayed on the basis of said access permission instruction and a personal security code input by the user.

16. An image display method-according to claim 10, wherein said synthesizing step includes a synthesizing and displaying step for displaying in a predetermined form, contents of at least one of said original image data and said partial image data.

17. An image display method according to claim 10, wherein said synthesizing step includes a synthesizing and displaying step for selecting data designated from outside only, from said original image data, and for displaying contents of selected data in a predetermined form.

18. An image display method according to claim 10, wherein said synthesizing step includes a synthesizing and displaying step for displaying in a predetermined form, contents of the section of said original image data that has been changed to said additional partial image data.

19. A recording medium readable by a computer, the recording medium storing an image reproduction program which contains an instruction configured to be executed by the computer, for extracting individual data from original image data and for synthesizing the extracted individual data to be displayed, said image reproduction program comprising:

an input process for inputting, separately from said original image data:
1) additional partial image data which is different from the original image data, and
2) attribute data specifying one or more functions that operate on at least part of the original image data to form function results that correspond to said additional partial image data;

an associating process for associating said additional partial image data with an individual data of said original image data, using the functions defined according to the attribute data; and a synthesizing process for changing a content regarding the at least part of said original image data that is associated in said associating process, and for synthesizing the changed content with other original image data.

20. A recording medium according to claim 19, wherein said attribute data contains a change function for changing at least part of said original image data to said additional partial image data.

* * * * *